FIG. 1.

INVENTORS.
LEROY M. LEWIS &
LEROY M. LEWIS, JR.
ATTORNEYS.

Jan. 27, 1953   L. M. LEWIS ET AL   2,626,785
HEAT CONDUCTION ARRESTOR IN AUTOMATIC BEVERAGE DISPENSERS
Filed Jan. 2, 1951   7 Sheets-Sheet 2

INVENTORS.
LEROY M. LEWIS &
LEROY M. LEWIS, JR.
BY
ATTORNEYS.

Jan. 27, 1953 L. M. LEWIS ET AL 2,626,785
HEAT CONDUCTION ARRESTOR IN AUTOMATIC BEVERAGE DISPENSERS
Filed Jan. 2, 1951 7 Sheets-Sheet 5

FIG. 12.

INVENTORS.
LEROY M. LEWIS &
LEROY M. LEWIS, JR.
BY
ATTORNEYS.

FIG. 16.

INVENTORS.
LEROY M. LEWIS &
LEROY M. LEWIS, JR.
BY Besser Harding
ATTORNEYS.

Patented Jan. 27, 1953

2,626,785

UNITED STATES PATENT OFFICE 2,626,785

HEAT CONDUCTION ARRESTER IN AUTOMATIC BEVERAGE DISPENSERS

Leroy M. Lewis and Leroy M. Lewis, Jr., Rosemont, Pa., assignors to American National Dispensing Co., Lansdale, Pa., a corporation of Pennsylvania Application January 2, 1951, Serial No. 203,872

4 Claims. (Cl. 257—212)

1

This invention relates to a vending machine and more particularly to a coin operated vending machine adapted to dispense beverages comprising a mixture of one or more solids with a liquid.

A machine in accordance with this invention is particularly adaptable for the dispensing of hot food beverages, such as, for example, coffee, cocoa, soups and the like. It is well known that the majority of food products which are prepared with a view to mixing them with hot water for serving as a beverage can best be preserved in the dry state. An excellent example of this is coffee of the instant type. Such coffee in powdered or granular form retains its flavor for a very much longer period of time than an instant coffee prepared and stored in the form of a concentrated liquid. It is also true that other food products, such as cocoa and soup concentrates, will retain their flavor in the dry form far longer than in a concentrated liquid form if unrefrigerated.

There are numerous problems involved in developing an economical and satisfactory machine which will store one or more food products in a dry state and dispense them in admixture with a hot liquid. One of the principal problems is to prevent the vapor emanating from the hot liquid from reaching the stored food products and thus causing them to become gummy and clog the dispensing mechanism.

Another principal problem is to provide adequate means for thoroughly mixing the food product with the liquid. Such means must insure that all of the food product dispensed from the food storage means will be thoroughly mixed with the liquid, leaving no residue.

A still further problem of major importance is to provide combined storage and dispensing means which will insure that an accurate amount of food product will be dispensed from the storage means when needed.

As an aid in solving these and other problems, it is known to utilize a heating jacket to keep the mixing bowl and the passage leading from the mixing bowl to the stored food product warm. This, unfortunately, has resulted in the transfer of an undesirable amount of heat to the storage chamber and the consequent deterioration of the food product.

It is, therefore, an object of this invention to provide a vending machine which will dispense one or more food products in admixture with a hot liquid and which will prevent excessive amounts of heat from reaching the stored food product.

2

These and other objects of this invention will become apparent on reading the following description in conjunction with the drawings, in which.

Figure 1:
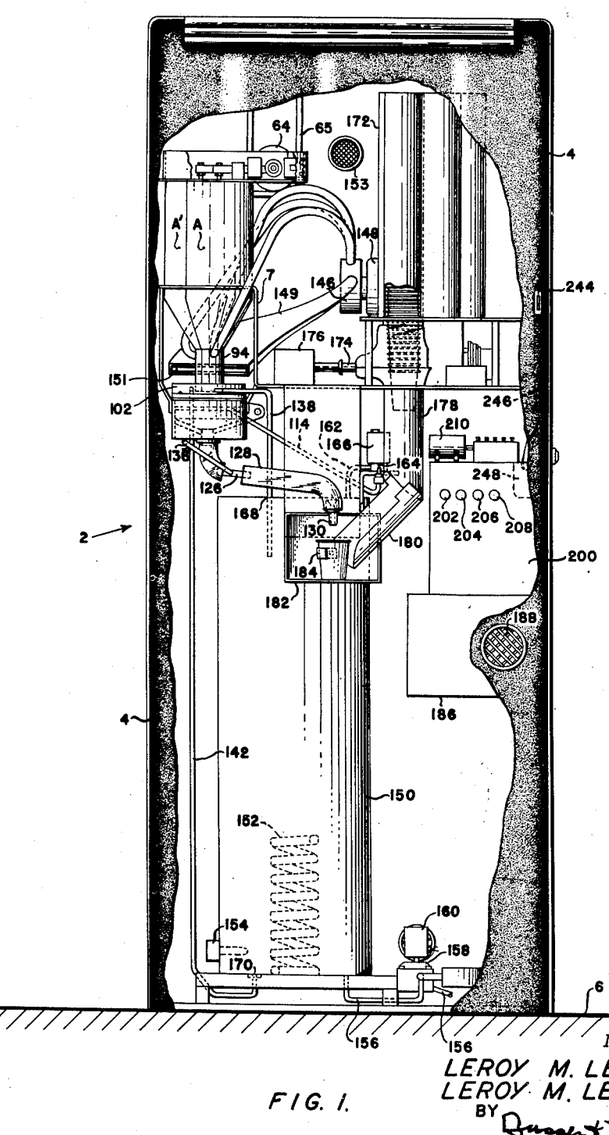
Figure 1 is a front elevation of a vending machine in accordance with this invention with a part of the casing broken away.

A vending machine 2 in accordance with this invention is shown in Figure 1. As shown, the vending machine has a casing 4 which acts to support and enclose the various component parts of the vending machine. The casing 4 is shown resting on a floor 6.

Supported within the casing principally by frame 7 are three identical storage hoppers A, A' and A''. As is illustrated more clearly in Figure 2, each of the identical storage hoppers comprises a casing 8 which has a pair of walls 10 separated by 120° and curved front wall 12 which has an inwardly sloping lower portion 14. The hoppers are preferably air tight except for an outlet opening.

Figures 2, 3, 4, 5, 6:
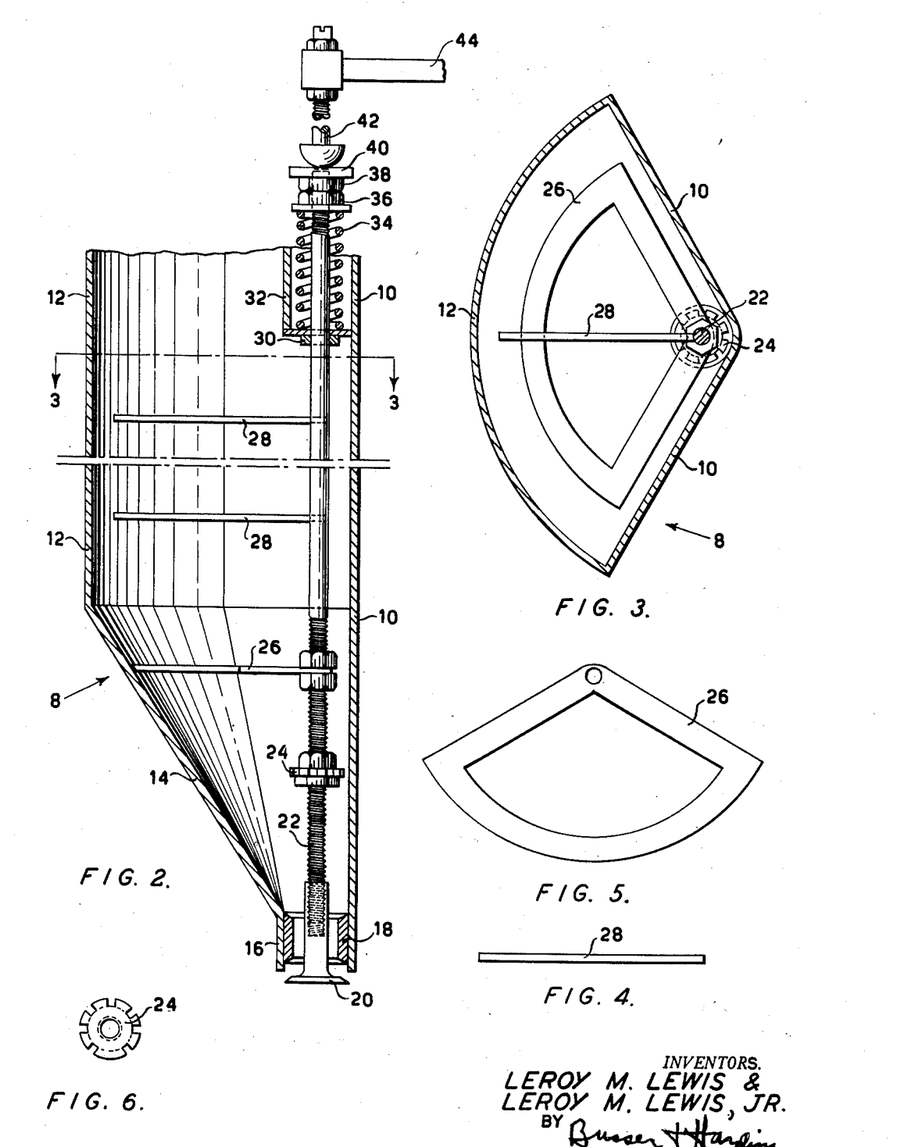
Figure 2 is an elevation through one of the food storage hoppers with the casing broken away.
Figure 3 is a section taken on the plane indicated by the line 3—3 in Figure 2.
Figure 4 is a plan view of an agitator in the hopper of Figure 2.
Figure 5 is a plan view of an agitator in the hopper of Figure 2.
Figure 6 is a plan view of an agitator in the hopper of Figure 2.

Casing 8 has a discharge neck 16 in which is inserted a valve seat member 18. A valve 20 is adapted to engage the valve seat member 18 and is threadably secured to a stem 22. Stem 22 carries a serrated agitator 24, a quadrant agitator 26 and straight agitators 28 in that order from the lower portion of the stem to the upper portion of the stem. Stem 22 passes upwardly through bushing 30 and casing 32.

A coil compression spring 34 within casing 32 and resting on the bottom thereof encompasses stem 22 and has its upper end abutting against a flanged nut 36. A nut 38 carries a plate 40 which is adapted to coact with a tappet 42 which is, in turn, secured to a rocker arm.

The valves 20 of the storage hoppers A, A' and A'' are operated by mechanism which is best shown in Figures 7–11. The tappets 42 associated with the valves 20 in the hoppers A, A' and A'', respectively, are secured to rocker arms 44, 46 and 48, respectively. These rocker arms are journalled on a shaft 50 which, in turn, is carried at either end by supports 52, 52. Supports 52 are secured to plate 51 which has a rubber gasket sheet 53 adapted to seal closed the tops of the hoppers A, A' and A''. Spacers 54 encompass shaft 50 and keep the three rocker arms properly positioned on shaft 50.

Figure 7:
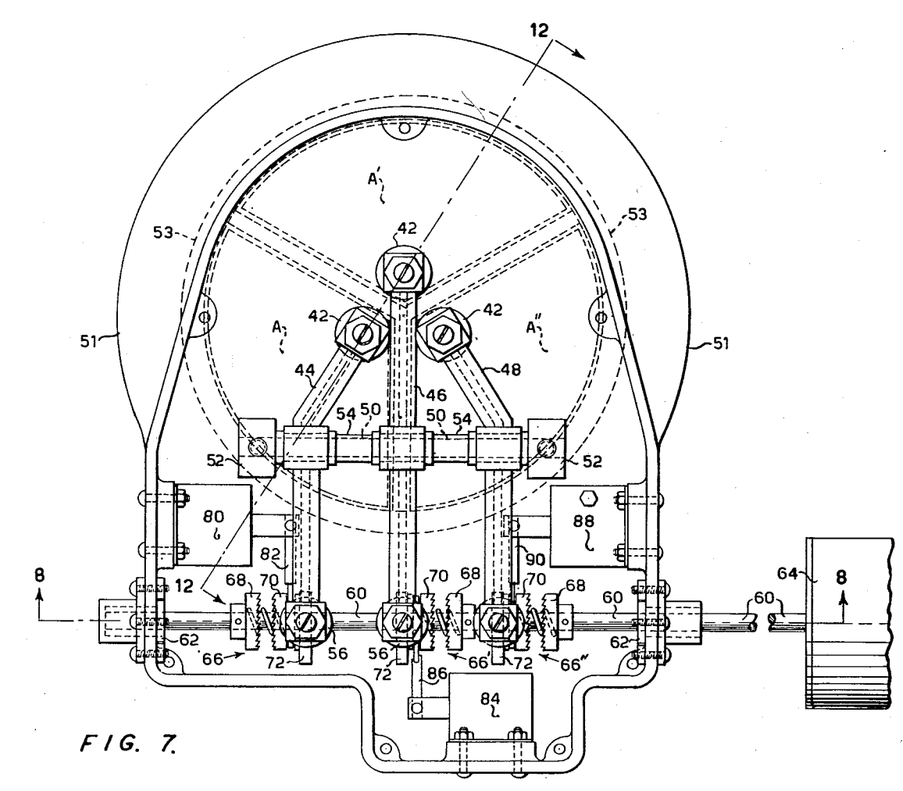
Figure 7 is a plan view of the operating mechanism for the hopper dispensing valves.
Figure 8:
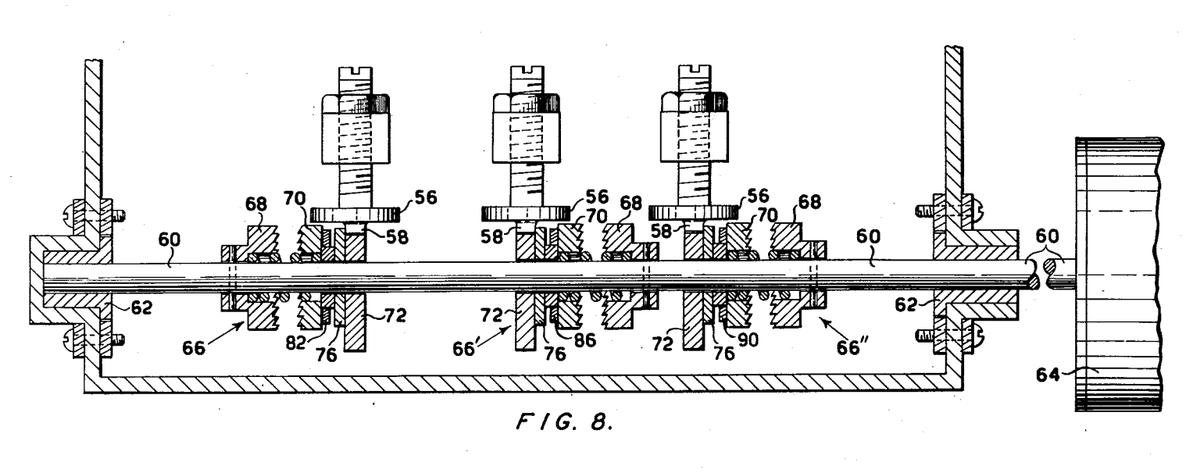
Figure 8 is a section taken on the plane indicated by the line 8—8 in Figure 7.
Figure 9:
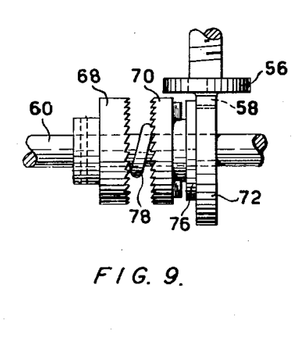
Figure 9 is a rear elevation of one of the cams of Figure 8 showing the cam clutching means in the disengaged position.
Figure 10:
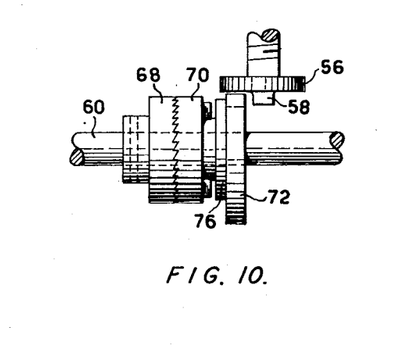
Figure 10 is a rear view of the cam of Figure 9 showing the cam clutching means in the engaged position.
Figure 11:
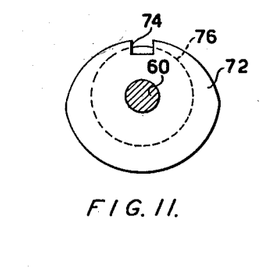
Figure 11 is a side elevation of the cam of Figure 9.

Each of the rocker arms 44, 46 and 48 have adjustably secured on their rear ends a tappet 56. Tappets 56 have on their lower surface a projection member 58. A shaft 60 is carried in bearings 62, 62 below tappets 56 and is connected to a motor 64 carried by support 65 (see Fig. 1). In association with each tappet 56 and shaft 60 are identical clutches 66, 66' and 66''.

Each clutch comprises a serrated faced member 68 which is keyed to shaft 60 and a member 70 having a serrated face adapted to engage the face member 68. Each member 70 has secured thereto a cam 72 which has an opening 74 at the cam's low point and adapted to permit the entry of tappet projection 58 and a flange 76 which is adapted to abut against one side of projection 58. Compression coil spring 78 is carried inside members 68 and 70 so as to bias member 70 away from member 68 and cause opening 74 to embrace projection 58, thus insuring that valve 20 will be in the closed position after the declutching occurs. Declutching cannot occur except when valve 20 is in the closed position, since cam 72 will abut against projection member 58 until this member enters opening 74.

Member 70 of clutch 66 is forced against spring 78 into the clutched position by a solenoid 80 through fork 82. The member 70 of clutch 66' is operated by solenoid 84 through fork 86 and member 70 of clutch 66'' is operated by solenoid 88 through fork 90.

Shaft 60 is connected to an electric motor 64. It will be apparent that when motor 64 is operated, the cams which are clutched to shaft 60 will rock the related rocker arms, thus opening and closing the desired valve 20. It is preferable that the shaft 60 be operated at about 400 R. P. M. varying widely depending, of course, on factors such as the food product to be dispensed. Such a speed provides extremely accurate metering of the food products out of the hoppers and permit the agitators to work with maximum efficiency.

Figure 12:
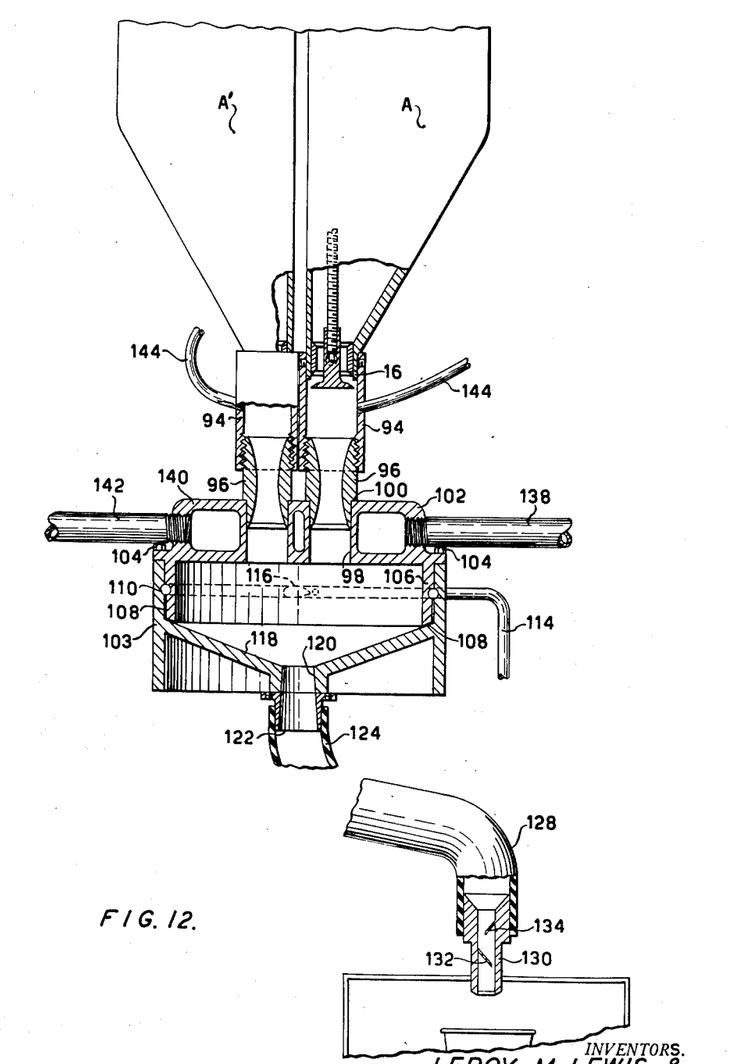
Figure 12 is a sectional view showing two of the storage hoppers and the mixing bowl taken on the plane indicated by the line 12—12 in Figure 7 and also showing a portion of the dispensing spout broken away.

The hoppers A, A' and A'' are each supported by a sleeve 94 into which the discharge neck 16 fits. Sleeve 94 is threaded to a Venturi tube 96 which fits into bowl inlet opening 98. Each tube 96 has a flange 100 which engages the bowl cover 102.

Bowl cover 102 is secured to bowl 103 by bolts 104. The cover 102 has a circular flange 106, the upper portion of which fits tightly inside bowl 103. The lower portion of flange 106 is spaced slightly away from the inner surface of bowl 103 providing a passage 108. Bowl 103 has a semicircular cut-out portion 110 forming an annular conduit above passage 108. A hot water supply line 114 runs into cut-out portion 110 tangentially at 116. It will be apparent from the construction of top 102 and bowl 103 discussed thus far that hot water supplied by pipe 114 will be delivered to the bowl without splashing and in a manner such that there will be a flow of water throughout the full extent of the bottom of the bowl.

The bowl bottom 118 slopes downwardly toward discharge opening 120, the bottom 118 forming together with flange 106 a portion of passage 108. Discharge orifice 120 is shaped like a truncated cone having its greatest diameter at its lower end 122. It will be noted that the bowl bottom 118 and discharge orifice 120 form a venturi which promotes the discharge of the beverage to be vended. It will further be noted that the tubes 96 are offset from discharge orifice 120 in order that the ingredients being discharged from the hopper will fall into the bowl rather than directly through orifice 120.

The flow of liquid from the bowl 103 after passing through discharge orifice 120 is carried by a tube turn 124, a tube 126 and a tube 128. In order to prevent splasing in a receiving vessel, a baffled nozzle 130 is placed in the end of tube 128. Nozzle 130 has a smaller radius than the other flow conducting tubes and has opposed baffles 132 and 134 to reduce the rate of discharge into the receiving vessel and prevents splashing therein. Tube 126 has an upwardly extending vent tube 136 to insure adequate venting of tube 128 (see Fig. 1).

In order to prevent the condensation of any vapor rising from bowl 103 on bowl inlet opening 98 and tube 96, hot water is supplied through pipe 138 to passage 140 in top 102. Passage 140 takes a circular path exterior of inlet openings 98 and tubes 96 and is discharged through pipe 142. Since top 102 is in heat conducting relationship with bowl 103, this hot water circulation keeps bowl 103 warm, thus preventing the chilling of the first drink to be made after a period of non-use.

In order to prevent any steam rising from bowl 103 into the hoppers A, A', A'' or into the passages formed between the hoppers and the bowl, a flow of air is introduced into each sleeve 94 below each valve 20 through a line 144. Each line 144 is connected to a centrifugal blower 146 of any conventional type well known in the art which is driven by a motor 148 (Fig. 1).

A duct 149 leads from blower 146 and discharges at 151 towards sleeves 94. Ducts 149 supply air which cools down the upper portions of sleeves 94 and dissipates heat rising by convection from bowl cover 102. This prevents the undesirable heating of hoppers A, A' and A'' which would have a deleterious effect on the food product stored therein. A vent 153 is provided to exhaust the air thus supplied.

When the flow of water from the bowl into tube 128 is sufficient to result in a full capacity flow of water through nozzle 130, the air supplied by lines 144 will not be able to vent through nozzle 130 as rapidly as is desirable. This would result in a restriction in the continuous flow of air from lines 144 downwardly into the bowl. The provision of vent tube 136 by providing a passage through which the air can vent irrespective of the flow conditions in nozzle 130, insures the desired continuous flow of air through lines 144 downwardly into the bowl.

The hot water utilized by the vending machine is supplied by a conventional hot water tank 150 which has a heating coil 152. The temperature of the water in the tank is controlled by a thermostatically controlled switch device 154.

Tank 150 has a water supply pipe 156 which has a valve 158 controlled by solenoid 160. The bowl hot water supply line 114 is connected to the top of tank 150 by a pipe 162 which has a valve 164 controlled by solenoid 166.

Pipe 138 and pipe 142 which respectively supply and exhaust hot water into and out of passage 140 in top 102 are connected to tank 150 at 168 and 170, respectively. It will be apparent that the pipes 168 and 170 together with passage 140 form a constantly circulating hot water system with tank 150.

A cup dispenser 172 has a releasing plunger 174 operated by a solenoid 176. A tube 178 and a slide 180 are adapted to carry a released cup to platform 182 and support bracket 184 which are adapted to support a cup directly below nozzle 130. Any suitable automatic cup dispensing device may be used. Thus, for example, the solenoid 176 could be connected to the plunger 21 of the cup dispenser disclosed in Patent 1,260,432, issued to H. Nias and dated March 26, 1918. If the Nias dispenser were utilized, of course, his cup supporting means comprising his spring 40 and lugs 41 would not be utilized since here it is desired to permit the cup to freely fall down tube 178.

A wire recorder 186 of any kind well known in the art may be secured to the front of cabinet 4. The cabinet 4 has a cut-out portion for the reception of the wire recorder speaker 188.

Secured within casing 4 is a control box 200. The contents of the control box will be made more apparent by the description of the wiring diagram shown in Figure 16 which will follow later. A series of selector switches 202, 204, 206 and 208 have operating buttons protruding through the control box 200 and through the casing 4. The vendee will push a selector button so that the combination which he desires will result. Thus, for purposes of example, pushing selector switch 202 will provide the vendee with a cup of coffee without cream or sugar, selector button 204 will provide a cup of coffee with sugar, button 206 will provide a cup of coffee with cream and button 208 will provide a cup of coffee with sugar and cream.

Figure 13:
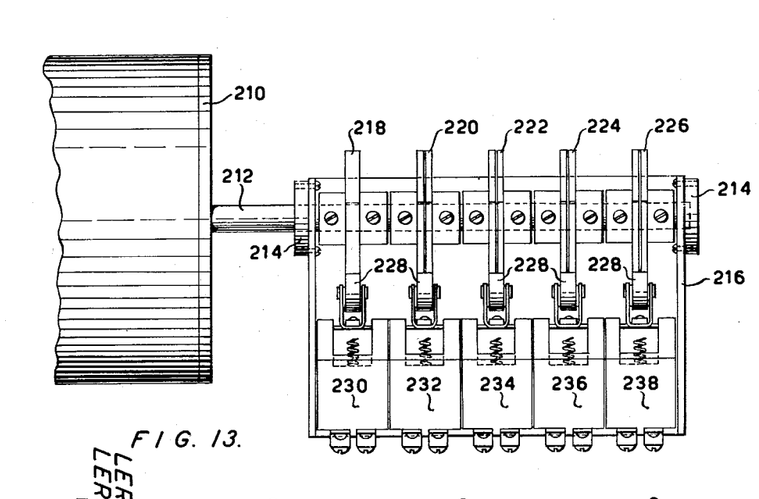
Figure 13 is a front elevation of the control cams of Figure 1 with the front of the control cam casing removed.
Figure 14:
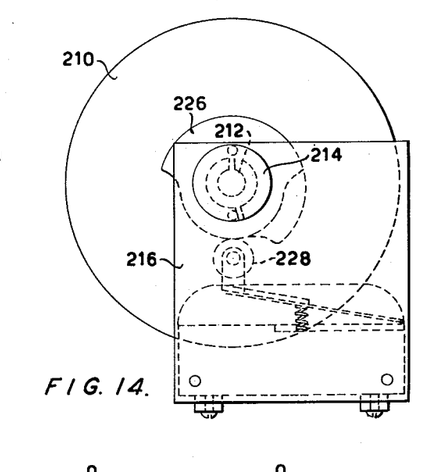
Figure 14 is a side elevation of the control cams of Figure 13.

Resting on top of control box 200 is a non-overrunning motor 210 having suitable reduction gears and which drives a shaft 212 carried in bearings 214. Bearings 214 are secured to a switch box 216 (Fig. 13). A series of cams 218, 220, 222, 224 and 226 are secured to shaft 212 and adapted to operate switches 230, 232, 234, 236 and 238, respectively, through the medium of cam followers 228, which are spring biased against the cams.

Figure 15:
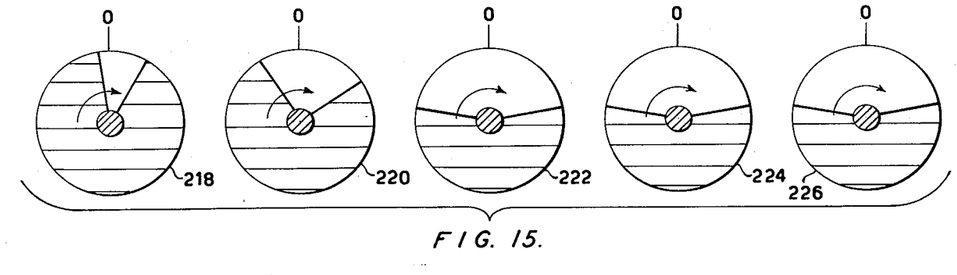
Figure 15 is a schematic showing of the operating range of the cams of Figure 13.

The arc through which each cam cams down its respective follower 228 is shown schematically in Figure 15, the camming down operation taking place through the arc which is shaded. The cams rotate clockwise and it will be apparent that from the zero position cam 218 operates immediately followed soon thereafter by cam 220 and then simultaneously by cams 222, 224 and 226. Again cams 222, 224 and 226 permit their respective followers to move upwardly thus disengaging their respective switches before cam 220 so operates, the cam 220, in turn, operating before the cam 218 permits its follower to rise and operate its respective switch.

It will be apparent that the precise time of operation of the various cams will vary depending on the food product being dispensed as will the speed of rotation of shaft 212. As in the illustrative case, it is preferable that shaft 212 rotate at a speed of about 8–12 R. P. M.

Cams 220, 222, 224 and 226 close switches 232, 234, 236 and 238 when they cam their respective followers 228 downwardly. In the case of cam 218 it acts to shift the position of switch 230 which is a two-position switch as will be made more apparent in the description of the wiring diagram.

On the front of casing 4 at the right hand side is a coin slot 244 which is connected to a coin conduit 246 leading to a conventional coin operating and receiving mechanism 248 consisting primarily of a switch momentarily operated by the passage of the coin. The switch may be, for example, one such as is disclosed in Patent 2,461,486 issued February 8, 1949, to H. B. Vroom. As is well known in the art, the coin mechanism may have means to reject slugs.

Figure 16:
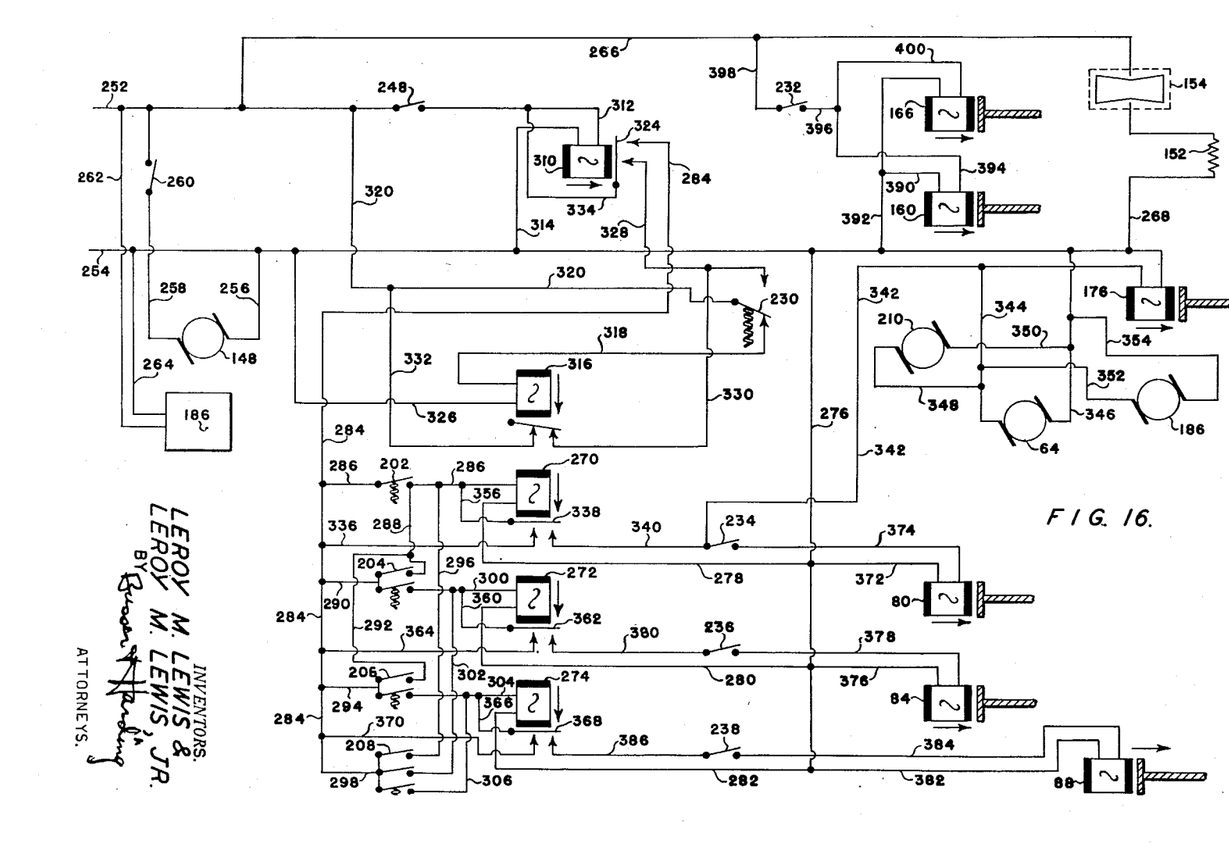
Figure 16 is a wiring diagram of the vending machine power and control circuits.

The overall operation of the vending machine will be clarified by a consideration of the wiring diagram shown in Figure 16. A 110 volt power supply line comprising a line 252 and 254 may be utilized by way of example. Blower motor 148 is connected across the power supply lines by line 256 and line 258, the latter line having a normally closed switch 260, thus providing for the normal continuous operation of blower 148.

Lines 262 and 264 are connected to power supply lines 252 and 254, respectively, and supply power to all of the circuits of wire recorder 186 with the exception of the driving motor and its controls.

Heating coil 152 of hot water tank 150 is connected across power supply lines 252 and 254 by lines 266 and 268, respectively. The thermostatically controlled switch 154 is placed in line 266.

Relays 270, 272, and 274 which are associated with the selector switches are connected to line 276 which is connected to power supply line 254 by lines 278, 280 and 282, respectively.

Relay 270 is connected to line 284 as follows: through line 286 in which selector switch 202 is placed; through line 286, line 288, selector switch 204 and line 290; through line 286, line 288, line 292, selector switch 206 and line 294; and through line 286, line 296, selector switch 208 and line 298.

Relay 272 is connected to line 284 as follows: line 300, selector switch 204 and line 290; and line 300, line 302, selector switch 208 and line 298.

Relay 274 is connected to line 284 as follows: by line 304, selector switch 206 and line 294; and by line 304, line 306, selector switch 208 and line 298.

When a coin is placed in slot 244, the coin drops down and actuates switch 248, momentarily energizing relay 310 which is connected to power lines 252 and 254 by lines 312 and 314, respectively.

Since relay 316 is energized being connected to power supply line 252 by line 318, switch 230 and line 320 and to line 254 by line 326, line 284 is connected to power supply line 252 through switch element 324 of relay 310, lines 328 and 330, relay 316 and lines 332 and 320.

As will be made apparent later, closing of switch 248 causes motor 210 to drive which in turn results in cam 218 immediately camming switch 230 so that it connects line 320 with line 328 instead of with line 318. This results in connecting line 328 to line 252 through switch 230 and line 320 causes relays 316 to be deenergized and, therefore, deenergizes the circuit through relay 316 which connects line 328 to line 252.

Switch 230 is shifted to contact line 328 before coin mechanism switch 248 opens. The relay 310 is thus kept energized since line 312 is connected to line 328 through line 334 and the switch element 324 of relay 310.

Now, if the customer determines that he wants coffee without sugar or cream and consequently closes selector switch 202, it will be apparent that relay 270 will be energized which will connect line 284 to the motor 64 through line 336, switch element 338 of relay 270, line 340, line 342 and line 344. Motor 64 is also connected to line 254 by line 346. Thus as soon as relay 270 is closed, motor 64 commences to operate resulting in the reciprocation of valves 20 and the dispensing of the selected food products into bowl 102.

Cam control motor 210 being connected to line 344 by line 348 and to line 346 by line 350 will also commence to operate at this time. Similarly the wire tape recorder motor 186 being connected to line 344 by line 352 and to line 346 by line 354 will commence to operate.

In addition, the closing of relay 270 will actuate solenoid 176 since it is connected to line 342 and to power supply line 254 and thus a cup will be released and positioned for the reception of the beverage to be dispensed.

When relay 270 is energized, it is connected to line 284 through line 286, line 356, switch element 338 and line 336 thus keeping the relay energized irrespective of selector switch 202.

It will be apparent from the above description of the manner in which relay 270 is connected to line 284 through selector switches 204, 206 and 208 that the closing of any of these switches as well as the closing of switch 202 will result in the relay 270 being energized. Similarly it will be seen that closing of either of the selector switches 204 or 208 will result in energizing relay 272. Relay 274 will be energized by closing either selector switch 206 or selector switch 208.

As in the case of relay 270, the relays 272 and 274 each have a holding circuit connecting these relays to line 284 and by-passing all selector switches. The holding circuit of relay 272 comprises line 300, line 360, switch element 362 of relay 272 and line 364 which is connected to line 284. The holding circuit of relay 274 comprises line 304, line 366, switch element 368 of relay 274 and line 370 which is connected to line 284.

Clutch solenoid 80 which is utilized to clutch cam 72 of clutch 66 to shaft 60 is connected to line 276 by line 372 and to line 340 by line 374 and switch 234 which is operated by cam 222.

Solenoid 84 which acts to clutch cam 72 of clutch 66' is connected to line 276 by line 376 and to line 364 through line 378, switch 236, which is controlled by cam 224, line 380 and switch element 362 of relay 272.

Solenoid 88 which acts to clutch the cam 72 of clutch 66" to shaft 60 is connected to line 276 through line 382 and to line 370 by line 384, switch 238, which is controlled by cam 226, line 386 and switch element 368 of relay 274.

Solenoid 160 which controls water supply valve 158 is connected to power supply line 254 through line 390 and 392 and to power supply line 252 through lines 394, and 396, switch 232, which is controlled by cam 220, line 398 and line 266. Solenoid 166 which operates valve 164 which controls the flow of hot water to bowl 103 is connected to power supply line 254 by line 392 and is connected to line 396 by line 400.

The operation of the vending machine where it is desired to utilize it for dispensing a cup of coffee and where hoppers A, A', A" consequently contain powdered instant coffee, powdered or granular sugar and powdered cream, respectively, will be described as being exemplary.

Switch 260 will normally be closed and thus blower motor 148 will operate continuously causing blower 146 to supply a flow of air which will pass into each hopper and downwardly into the passages below the hopper, the hopper itself being air-tight. Also a constant circulation of hot water through chamber 140 will take place through tank 150 and through chamber 140, the temperature of tank 150 being maintained by heating coil 152 controlled by thermostatic switch 154. The circuits of the wire recorder 186 with the exception of the motor and its controls are continuously energized.

The initial step of the customer is to insert an appropriate coin in slot 244 which results in the momentary closing of switch 248. This, as we have seen results in energizing line 284 through the medium of relays 310, 316, switch 230 and the circuits associated with these elements, it being particularly noted that relay 310 has a holding circuit to keep it energized when switch 248 opens.

The customer then selects his beverage, i. e., coffee alone, coffee and sugar, coffee and cream or coffee, sugar and cream, by pushing the spring loaded push button of selector switch 202, selector switch 204, selector switch 206 or selector switch 208, respectively. Irrespective of which selector switch is pushed, it will be apparent from the above described circuit diagram that relay 270 will be energized. This results, in turn, in energizing line 340, thus causing motors 64, 186 and 210 and solenoid 176 to operate.

The operation of solenoid 176 pushes plunger 174 inwardly resulting in the release of a cup from a cup dispensing mechanism 172, the cup falling through tube 178, slide 180 and being positioned below nozzle 130.

The operation of wire recorder motor 186 results in the delivery of the recording made on the wire recorder tape to the vendee through the speaker 188.

The operation of motor 210 rotates shaft 212 which carries the timing cams 218, 220, 222, 224 and 226. As is apparent from the schematic showing of Figure 15, cam 218 immediately causes switch 230 to shift from line 318 to line 328 which connects line 328 to power supply line 252 through the alternate route of line 320. This operation of switch 230 simultaneously deenergizes relay 316, thus opening the circuit through relay 316 which originally connected line 252 to line 328.

Next in sequence is the closing of switch 232 by cam 220. This energizes solenoids 160 and 166 which, in turn, results in the admission of water to tank 150 through valve 158 and the supply of hot water to bowl 103 through the opening of valve 164.

Thus the hot water commences to flow in bowl 103 before any of the contents from the hoppers are delivered to the bowl. As pointed out above, the vapor rising from the hot water is prevented from getting to the powdered materials before they get into the bowl by means of hot water chamber 140 and air supplied by blower 146.

Cams 222, 224 and 226 now cam closed switches 234, 236 and 238. This results in the energizing of solenoid 80 irrespective of which selector switch has been closed. Thus, in all cases, cam 72 of clutch 66 will be clutched to shaft 60 which is now rotating since motor 64 has been energized. Thus the valve 20 of hopper A will be rapidly reciprocated permitting coffee to be metered out into bowl 103 where it will fall on the hot water passing over the surface of the bottom 118 of the bowl.

Similarly sugar, in addition to the coffee, will be dispensed from hopper A' if either selector switch 204 or selector switch 208 was closed since solenoid 84 will then be energized causing the operation of clutch 66'. Similarly, in addition to coffee, the powdered cream in hopper A'' will be dispensed if either selector switches 206 or 208 was closed. This will result in solenoid 88 being energized, which, in turn, operates clutch 66''. The pushing of selector switch 208 will thus apparently result in the energizing of solenoids 80, 84 and 88 and thus in the simultaneous dispensing of coffee, sugar and cream into bowl 103.

Next in the sequence of events, cams 222, 224 and 226 permit switches 234, 236 and 238 to open thus stopping the dispensing of the selected ingredients from the hoppers into the bowl. As described above, as each solenoid is deenergized, spring 78 of each clutch will push clutch member 70 away from clutch member 68 and force cam 72 against projection 58 until opening 74 engages projection 58 at which time the spring 78 will force flange 76 to abut against the side of projection 58. The cams as thus positioned permit each spring 34 to fully close each valve 20.

Next, cam 220 permits switch 232 to open thus stopping the flow of water into the tank 150 through valve 158 and into bowl 103 through valve 164 since solenoids 160 and 166 will be deenergized.

Following this, cam 218 permits switch 230 to disengage line 328 and reengage line 318. Cam 218 is cut so that there is a sufficient time interval between the disengagement of line 328 and the reengagement of line 318 such that relay 310 will become deenergized before relay 316 becomes energized. This results in deenergizing line 284 which, in turn, results in deenergizing solenoid 176, motors 64, 186 and 210 and any of the relays 270, 272 and 274 which were energized. This completes a full cycle of operation.

The above described vending machine and its operation is illustrative only and this invention is intended to be limited only as set forth in the claims.

This invention is an improvement in the vending machine disclosed and claimed in patent application Serial No. 95,655, filed May 27, 1949, under the name of Richard D. Price and owned by applicants' assignee.

What is claimed is:

1. In a beverage vending machine, a mixing bowl having an outlet, a hot water supply tank, a water delivery conduit leading from said tank to said bowl, a storage receptacle, a passage connecting said bowl and said storage receptacle, a hot water jacket for heating said bowl and the lower portion of said passage, means to connect the hot water supply tank to said hot water jacket to provide a continuous circulation of hot water through the jacket and means to insulate the storage receptacle from the heat in said bowl and said passage.

2. In a beverage vending machine, a mixing bowl having an outlet, a hot water supply tank, a water delivery conduit leading from said tank to said bowl, a storage receptacle, a passage connecting said bowl and said storage receptacle, a hot water jacket for heating said bowl and the lower portion of said passage, means to connect the hot water supply tank to said hot water jacket to provide a continuous circulation of hot water through the jacket and means to supply a flow of air about the upper portion of said passage to insulate the storage receptacle from the heat in said bowl and in the lower portion of said passage.

3. In a beverage vending machine, a mixing bowl having an outlet, a hot water supply tank, a water delivery conduit leading from said tank to said bowl, a storage receptacle, a passage connecting said bowl and said storage receptacle, a hot water jacket for heating said bowl and the lower portion of said passage, means to connect the hot water supply tank to said hot water jacket to provide a continuous circulation of hot water through the jacket, a blower and a conduit leading from the supply side of said blower to supply a flow of air about the upper portion of said passage to insulate the storage receptacle from the heat in said bowl and in the lower portion of said passage.

4. In a beverage vending machine, a casing having therein a mixing bowl having an outlet, a hot water supply tank, a water delivery conduit leading from said tank to said bowl, a storage receptacle, a passage connecting said bowl and said storage receptacle, a hot water jacket for heating said bowl and the lower portion of said passage, means to connect the hot water supply tank to said hot water jacket to provide a continuous circulation of hot water through the jacket, a blower and a conduit leading from the supply side of said blower to supply a flow of air about the upper portion of said passage to insulate the storage receptacle from the heat in said bowl and in the lower portion of said passage and an opening in the casing for the flow of air.

LEROY M. LEWIS.
LEROY M. LEWIS, Jr.

REFERENCES CITED

The following references are of record in the file of this patent:

UNITED STATES PATENTS

| Number | Name | Date |
| --- | --- | --- |
| 1,630,103 | Young | May 24, 1927 |
| 1,665,728 | Canright | Apr. 10, 1928 |
| 2,147,335 | De Fazi | Feb. 14, 1939 |
| 2,452,933 | Joppich et al. | Nov. 2, 1948 |
| 2,462,019 | Bowman | Feb. 15, 1949 |